United States Patent [19]

Higashide

[11] 3,938,000
[45] Feb. 10, 1976

[54] LAMP DRIVER FOR TELEPHONE PANEL INDICATOR LAMPS

[75] Inventor: Carlos S. Higashide, Elk Grove Village, Ill.

[73] Assignee: GTE Automatic Electric Laboratories Incorporated, Northlake, Ill.

[22] Filed: Apr. 29, 1974

[21] Appl. No.: 465,212

[52] U.S. Cl. ............... 315/205; 307/311; 315/208
[51] Int. Cl.² ........................................ H05B 37/00
[58] Field of Search ........ 307/311; 315/71, 72, 205, 315/208

[56] References Cited
UNITED STATES PATENTS
3,512,047   5/1970   Garde ............................... 315/71 X Primary Examiner—R. V. Rolinec
Assistant Examiner—Lawrence J. Dahl
Attorney, Agent, or Firm—David W. Heid

[57] ABSTRACT

An electrical circuit for limiting surge currents through incandescent indicator or display lamps is disclosed. It is essentially a constant current device having a current controlling transistor in the load circuit to limit the initial surge current to a first value after, which the lamp itself limits the current. Provision is made for testing of the lamp and circuit by maintenance personnel.

3 Claims, 1 Drawing Figure

U.S. Patent   Feb. 10, 1976   3,938,000
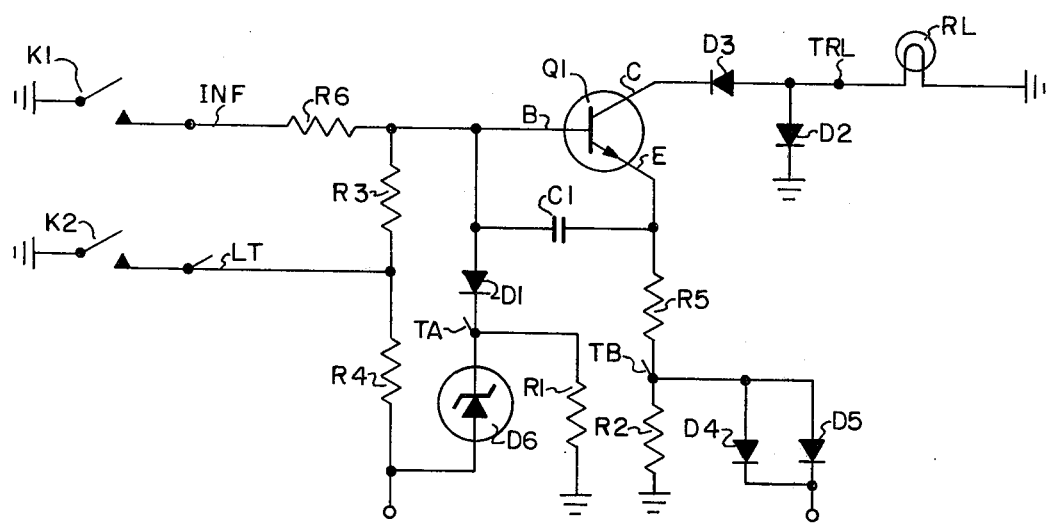

LAMP DRIVER FOR TELEPHONE PANEL INDICATOR LAMPS

BACKGROUND OF THE INVENTION

1. Field of the Invention

This invention relates generally to lamp control devices and more particularly to surge current control circuit to limit the lamp inrush current.

2. Description of the Prior Art

In a digital system, display lamps are usually subjected to a constant switching action. This is the worst mode of operation for incandescent lamps and results in an extremely short lamp life. The reason for this is that the cold lamp filament exhibits approximately one-tenth the resistance of the hot filament and when the lamp is switched on, there is an initial inrush current which is 10 times greater than the normal rated lamp current. This power surge is therefore 10 times greater than the lamp rating and lamp life is shortened.

Various attempts have been made to overcome the effects of this problem. Keep on circuits which allow a small current to flow through the lamp at all times have been used. The heater resistor is usually used to heat the lamp filament to something in the order of 75–85% of the hot filament resistance. This method of operation improves the "switched" lamp life but cannot equal the rated lamp due to polarization. Further the improved "switched" lamp life is obtained at the expense of wasted power during the idle state.

Another technique resorted to is a series resisitor to maintain a minimum resistance in the circuit. With such an arrangement 28 volt lamps are operated at 26 volts for increased life in a 50 volt environment and the inrush current is limited to approximately 175% of rated value. This method of operation eliminates power waste during the idle state and the excess polarization problem, but power comsumption is almost doubled during the "on" periods. Lamp life will be extended but will still fall short of rated value because of the 75% over current during inrush.

SUMMARY OF THE INVENTION

Accordingly it is an object of the present invention to improve the reliability of indicator lamps by providing a circuit to control them that eliminates the surge currents.

It is a further object of this invention to eliminate the use of heater resistors or series limiting resistors with such lamps.

BRIEF DESCRIPTION OF THE DRAWING

The above-mentioned objects and other features of the invention and manner of obtaining them will become more apparent, and the invention itself will be best understood by reference to the following description of an embodiment of the invention taken in conjunction with the accompanying drawing which is a schematic of the current limiting circuit of the present invention.

DESCRIPTION OF THE PREFERRED EMBODIMENT

In the drawing, input terminals INF and LT are adapted to be connected to a source of positive electrical potential to activate lamp RL. Terminal INF is normally connected to some control apparatus of a telephone central office, but is shown connected to a ground potential connected switch K1. Terminal LT is normally connected in multiple with a large plurality of other similar terminals and then to a switch such as switch K2 for use by the test personnel to ascertain the operability of the lamps and their associated circuits. The circuits and lamps would normally be connected to a source of electrical energy, which in a telephone exchange would be the 50 volt exchange battery. This battery has not been shown, instead only the conventional triangle and the short parallel lines have been shown to symbolize the source of negative potential and positive potential respectively.

The particular incandescent indicator lamp RL is connected with one terminal to ground potential and the other terminal to the control circuit output terminal TRL. This lamp in a particular embodiment is a Sylvania extended service bulb commonly known as type 48ESB. It is designed for use with telephone equipment and operates from a 48 volt source, drawing 0.04 amperes when hot. Its cold resistance is approximately 165 ohms.

The main active member of the current control circuit is an NPN transistor Q1, which has its collector C connected to the cathode end of diode D3 and through this diode to output terminal TRL. The transistors's emitter E is connected to the negative source of electrical energy via resistor R5 and a bias circuit consisting of diodes D4, D5 and R2. The diodes D4 and D5 are connected in parallel with their cathodes connected to the negative source and their anodes to a terminal TB and a terminal of resistor R5 which has its other terminal connected to the emitter. A resistor R2 is shown connected from the anodes of diodes D4 and D5 to ground potential to keep a minimal current flowing through the diodes to maintain it approximately 1 volt positive with respect to the base during the inactive period of the transistor. The bias current output at terminal TB is used in common by a large number of current control transistors such as Q1. The base B of transistor Q1 is connected to the negative current source via a 5 volt zener diode D6 through terminal TA and blocking diode D1. Resistor R1 from terminal TA to ground is for the purpose of maintaining a minimal current through zener diode D6. The constant base bias voltage supplied by the zener diode D6 at terminal TA is used by a plurality of control transistors such as Q1. Capacitor C1 connected between the base and emitter of the transistor is for the purpose of stabilizing the stage by making it insensitive to short noise spikes.

The remaining elements of the circuit are only for purposes of safety or reliability of the circuit. Resistor R6 functions to limit the input current from terminal INF. Resistor R3 has a similar current limiting function relative to input terminal LT. While resistor R4 is used to keep a negative bias on the base B of transistor Q1 when there is no input signal.

Diodes D2 and D3 are also protection diodes. Diode D2 functions to shunt large positive going noise spikes to ground, which might otherwise damage the transistor. Diode D3 blocks large negative spikes. The type selected has a very high peak inverse voltage rating.

Operation. The circuit as shown is basically a constant current source lamp driver circuit. The transistor Q1 has a negative cutoff bias on its base B which is overcome by a positive signal via terminals INF or LT. At which time the transistor begins to conduct a fixed constant current. The magnitude of the current is fixed at a level as determined by the constant base bias voltage, constant off bias voltage at TB and R5. The main current path then being from ground through the lamp RL, the collectoremitter path of the transistor through resistor R5 and diodes D4 and D5 to negative battery. With the biasing arrangement shown only a fixed amount of current can flow in this path until the lamp heats up and becomes the sole current limiting element, since the transistor then will be in a saturated state exhibiting a very low loss.

In one specific embodiment of the invention the following component values have been utilized to achieve very satisfactory operation; however it will be appreciated that these values are given by way of example.

| | |
|---|---|
| R1 | 4.87K |
| R2 | 4.02K |
| R3 | 23.2 K |
| R4 | 3.32K |
| R5 | 51.1 Ω |
| R6 | 1K |
| C | .1mf |
| D1, D2, D3 | IN 645 |
| D4, D5 | IN 5061 |
| D6 | IN 5231 |
| Q1 | 2N2219 |
| RL | Sylvania Type 48ESB |

While there has been shown and described a specific embodiment of the invention, other modifications will readily occur to those skilled in the art.

What is claimed is:

1. A lamp driver for switching electrical current from a power source to an incandescent lamp whose resistance is low during the first moments of application of power thereto; said lamp having one terminal connected to a first terminal of said power source, said lamp driver including a transistor having a base, a collector, and an emitter, a biasing diode having an anode and a cathode, said collector electrically connected to said incandescent lamp and said emitter electrically connected to a second terminal of said power source via said biasing diode in the anode to cathode direction, a zener diode in series with a first resistor having its anode connected to said second terminal and said resistor to said first terminal of said power source, said base electrically connected to a control input terminal operative to cause said transistor to begin conduction, and to said second terminal of said power source via a second resistor for maintaining said transistor in a nonconducting state and an isolating diode having its cathode connected to the junction of said zener diode and first resistor for maintaining a predetermined bias on said base during the conduction of said transistor.

2. A lamp driver as claimed in claim 1 wherein a second diode is serially connected between said collector and said lamp, and a third diode is connected across said lamp with the anodes of both said second and third diodes connected to a common lamp terminal.

3. A lamp driver as claimed in claim 2 wherein a third resistor is connected from said first terminal of said power source to said emitter for maintaining a minimal current flow through said biasing diode, and a capacitor is connected between the base and emitter of said transistor to stabilize its operation.

* * * * *